(12) United States Patent
Ha (10) Patent No.: US 8,054,265 B2
(45) Date of Patent: Nov. 8, 2011

(54) LIQUID CRYSTAL DISPLAY APPARATUS AND DRIVING METHOD THEREOF

(75) Inventor: Woo Suk Ha, Yongin-si (KR)

(73) Assignee: LG Display Co., Ltd., Seoul (KR)

( * ) Notice: Subject to any disclaimer, the term of this patent is extended or adjusted under 35 U.S.C. 154(b) by 889 days.

(21) Appl. No.: 11/283,760

(22) Filed: Nov. 22, 2005

(65) Prior Publication Data

US 2006/0108615 A1   May 25, 2006

(30) Foreign Application Priority Data

Nov. 23, 2004  (KR) .......................... 10-2004-0096630

(51) Int. Cl.
    *G09G 3/36*   (2006.01)
(52) U.S. Cl. ........................................... 345/89; 345/87
(58) Field of Classification Search ............. 345/87
    See application file for complete search history.

(56) References Cited

U.S. PATENT DOCUMENTS

| | | | | |
|---|---|---|---|---|
| 4,353,092 A * | 10/1982 | Bailey et al. | ................... | 348/672 |
| 5,063,607 A * | 11/1991 | FitzHenry et al. | ............. | 382/274 |
| 5,142,469 A * | 8/1992 | Weisenborn | ...................... | 700/17 |
| 5,490,222 A * | 2/1996 | Sugimoto | ...................... | 382/154 |
| 5,594,807 A * | 1/1997 | Liu | ............... | 382/128 |
| 5,598,184 A * | 1/1997 | Barkans | ........................ | 345/597 |
| 5,734,746 A * | 3/1998 | Jaspers | ......................... | 382/169 |
| 5,742,704 A * | 4/1998 | Suzuki et al. | ................... | 382/176 |
| 5,748,802 A * | 5/1998 | Winkelman | ................... | 382/271 |
| 5,793,886 A * | 8/1998 | Cok | ............... | 382/169 |
| 6,023,533 A * | 2/2000 | Sano et al. | ..................... | 382/274 |
| 6,064,775 A * | 5/2000 | Suzuki et al. | .................. | 382/254 |
| 6,559,837 B1 * | 5/2003 | Lasneski et al. | .............. | 345/204 |
| 6,694,051 B1 * | 2/2004 | Yamazoe et al. | .............. | 382/167 |

(Continued)

FOREIGN PATENT DOCUMENTS

KR   2003-0040127   *   7/2004
KR   2004057882 A   *   7/2004

OTHER PUBLICATIONS

Threshold Selection Using Quadtrees Wu, Angela Y.; Hong, Tsai-Hong; Rosenfeld, Azriel; Pattern Analysis and Machine Intelligence, IEEE Transactions on vol. PAMI-4, Issue 1, Jan. 1982 pp. 90-94.*

(Continued)

*Primary Examiner* — Richard Hjerpe
*Assistant Examiner* — Dorothy Harris
(74) *Attorney, Agent, or Firm* — McKenna Long & Aldridge, LLP (57) ABSTRACT

This invention relates to a liquid crystal display device that minimizes picture quality deterioration caused by signal distortion. The present invention selects an area within an image, which has a rapidly increasing or decreasing gamma voltage, identifies a border delineating two different intensity regions within the area, computes an average intensity within the area, and weights the gamma voltage for each pixel within the area based on the average intensity. A liquid crystal display device according to the present invention includes: a liquid crystal display panel; an analyzer analyzing a brightness characteristic of data in an area within an image; an average video signal voltage generator calculating an average brightness value in the area; a bordering value processing part calculating a bordering brightness value in the area; and a weighting part adjusting a pixel voltage according to the average brightness value and the bordering brightness value.

6 Claims, 7 Drawing Sheets

U.S. PATENT DOCUMENTS

| | | | |
|---|---|---|---|
| 6,795,053 B1* | 9/2004 | Funamoto et al. | 345/102 |
| 6,804,383 B2* | 10/2004 | Ogino | 382/128 |
| 6,970,605 B1* | 11/2005 | Kondo et al. | 382/254 |
| 7,010,163 B1* | 3/2006 | Weiss | 382/168 |
| 7,154,556 B1* | 12/2006 | Wang et al. | 348/452 |
| 7,209,595 B2* | 4/2007 | Kondo et al. | 382/254 |
| 7,515,205 B1* | 4/2009 | Wang et al. | 348/452 |
| 2001/0033260 A1* | 10/2001 | Nishitani et al. | 345/87 |
| 2003/0169248 A1* | 9/2003 | Kim et al. | 345/204 |
| 2004/0189586 A1* | 9/2004 | Nagase | 345/100 |
| 2004/0227712 A1* | 11/2004 | Miyasaka et al. | 345/89 |
| 2005/0057485 A1* | 3/2005 | Diefenbaugh | 345/102 |
| 2005/0104827 A1* | 5/2005 | Baik | 345/87 |
| 2005/0140616 A1* | 6/2005 | Sohn et al. | 345/87 |
| 2006/0008174 A1* | 1/2006 | Avinash et al. | 382/275 |

OTHER PUBLICATIONS

An improved moment-preserving auto threshold image segmentation algorithm Shitu Luo; Qi Zhang; Feilu Luo; Yanling Wang; Zhiyong Chen; Information Acquisition, 2004. Proceedings. International Conference on Jun. 21-25, 2004 pp. 316-318.*

Image Smoothing Based on Neighbor Linking Eklundh, J. O.; Rosenfeld, A.; Pattern Analysis and Machine Intelligence, IEEE Transactions on vol. PAMI-3, Issue 6, Nov. 1981 pp. 679-683.*

DLS: Dynamic Backlight Luminance Scaling of Liquid crystal Display Chang, N.; Choi, I.; Shim, H. Very Large Scale Intergration (VLSI) Systems, IEEE Transactions on vol. 12, No. 8, Aug. 2004, pp. 837-846.*

* cited by examiner

VERTICAL STRIPE PATTERN

Fig. 6

LIQUID CRYSTAL DISPLAY APPARATUS AND DRIVING METHOD THEREOF

This application claims the benefit of the Korean Patent Application No. P2004-96630 filed on Nov. 23, 2004, which is hereby incorporated by reference for all purposes as if fully set forth herein.

BACKGROUND OF THE INVENTION

1. Field of the Invention

The present invention relates to liquid crystal display devices for minimizing picture quality deterioration caused by signal distortion.

2. Description of the Related Art

Generally, a liquid crystal display device controls the light transmittance of a liquid crystal by use of electric fields, thereby displaying a picture.

Figure 1:
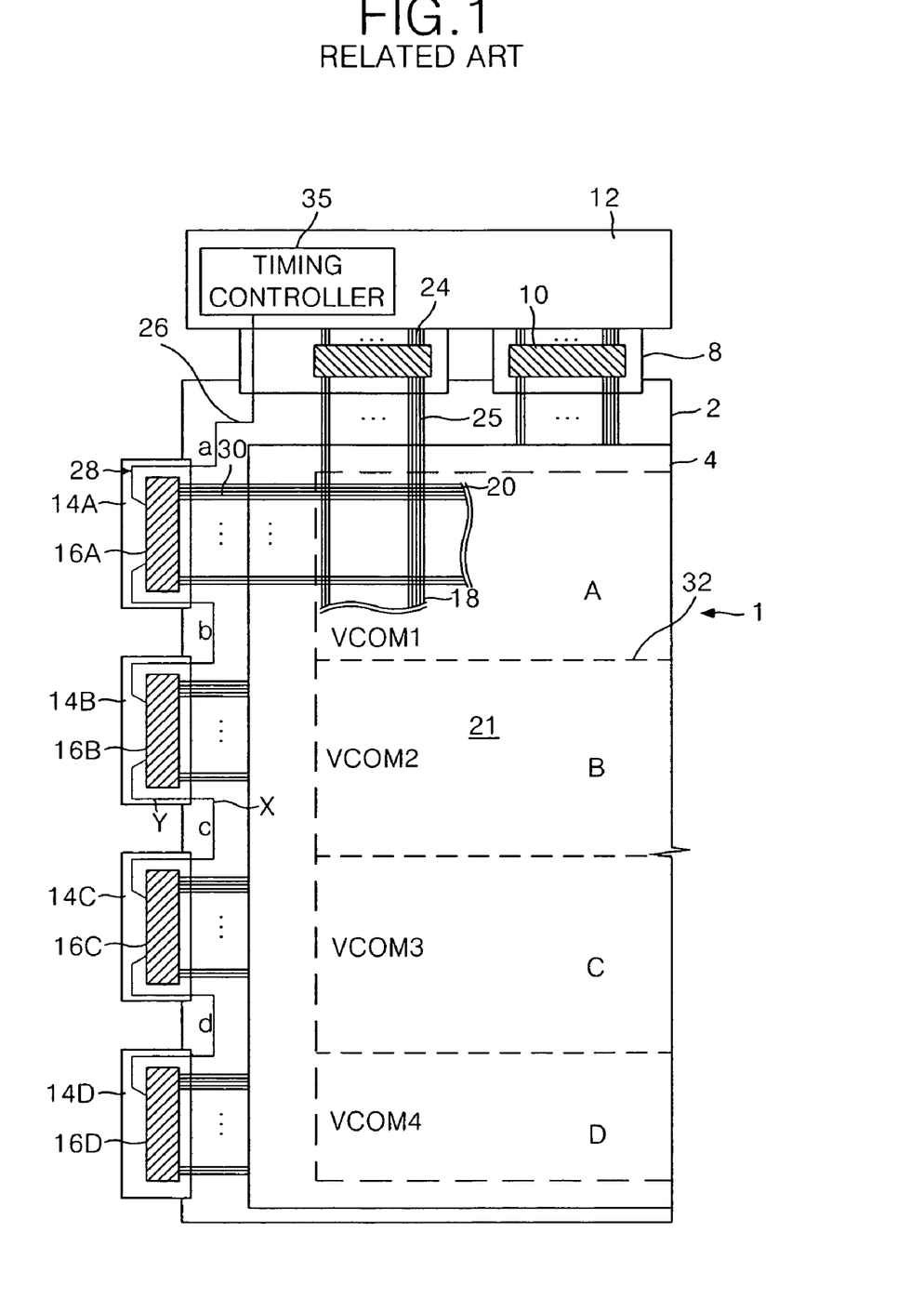
FIG. 1 is a plane view illustrating a configuration of a related art liquid crystal display device.

FIG. 1 is a diagram representing a liquid crystal display device of the related art. Referring to FIG. 1, the related art liquid crystal display device includes a liquid crystal display panel 1; a plurality of data tape carrier packages (TCP) 8, which are connected between the liquid crystal display panel 1 and data printed circuit boards (PCB) 12; a plurality of gate TCPs 14A to 14D connected to another side of the liquid crystal display panel 1; data driver integrated circuits (IC) 10 mounted on each of the data TCPs 8; and gate drive ICs 16A to 16D mounted on each of the gate TCPs 14A to 14D.

The liquid crystal display panel 1 includes a lower substrate 2 where a thin film transistor array is formed together with various signal lines; an upper substrate 4 where a color filter array is formed; and a liquid crystal, which is injected between the lower substrate 2 and the upper substrate 4. The liquid crystal display panel 1 includes a picture display area 21, wherein the picture display area 21 includes liquid crystal cells that are defined by the crossing of the gate lines 20 and the data lines 18. Data pads extend from the data line 18, and gate pads extend from the gate line 20, in the outer area of the lower substrate 2 located at an outer part of the picture display area 21.

The data TCP 8 has the data drive IC 10 mounted on it and input pads 24 and output pads 25 electrically connected to the data driver IC 10. The input pads 24 of the data TCP 8 are electrically connected to the output pads 25 of a data PCB 12 through an anisotropic conductive film (hereinafter "ACF"), and the output pads 25 are electrically connected to the data pads on the lower substrate 2 through the ACF.

The data driver ICs 10 convert a digital pixel data signal into an analog pixel voltage signal and supply the analog pixel signal to the corresponding data line 18 on the liquid crystal display panel 1.

The gate TCP 14A to 14D respectively have gate driver ICs 16A to 16D mounted on them, a gate drive signal transmission line group 28, and the output pads formed to connected to the gate driver ICs 16A to 16D. The gate driver signal transmission line group 28 is electrically connected to the signal line group 26 on the lower substrate 2 through the ACF, and the output pads 30 are electrically connected to the gate pads on the lower substrate 2 through the ACF.

The gate driver ICs 16A to 16D sequentially supply a scanning signal, i.e., gate high voltage signal VGH, to the gate lines 20 in response to input control signals. The gate driver ICs 16A to 16D supply a gate low voltage signal VGL to the gate lines in the remaining period except for a period when the gate high voltage signal VGH is supplied.

The signal line group 26 generally includes the following: signal lines that supply DC voltage signals like the gate high voltage signal VGH; the gate low voltage signal VGL; a common voltage signal Vcom; a ground voltage signal GND and a power supply voltage signal VCC that are supplied from a power supply; and gate control signals like a gate start pulse GSP, a gate shift clock signal GSC and a gate output enable signal GOE, which are supplied from a timing controller.

The signal line group 26 of the related art liquid crystal display device is formed in a minute parallel pattern in a very limited narrow space, such as the pad area, which is located at the outer area of the picture display part 21. The signal line group 26 is formed of the same gate metal layer as the gate lines 20. The gate metal is generally a metal that has a relatively high specific resistance 0.046, like AlNd. In this way, the signal line group 26 is formed in a minute pattern in a limited area and of a gate metal which has the relatively high specific resistance. Accordingly, the signal line group 26 includes a relatively high line resistance component X in comparison with the signal lines formed of a copper thin film in the existing gate PCB. Further, the ACF (not shown) for connecting the signal line group 26 to the gate drive signal transmission line group 28 includes a designated connection resistance component Y. In addition, the gate driver signal transmission line group 28 formed on a chip-on-film (COF), or the gate TCP 14A to 14D, include a designated line resistance component Z. These resistance components have a difference as much as X+2Y+2Z between the adjacent ICs. The resistance components cause line resistance to increase with increasing distance from the data PCB 12, thereby attenuating the signal supplied through the signal line group 26. Especially, the common voltage Vcom signal which is the standard of the gate drive signals is distorted by such a resistance, thereby deteriorating the quality of a picture which is displayed in the picture display part 21.

The signal line group 26 has line resistances (a, b, c, d) proportional to its line length, and is connected in series through the first and fourth gate TCPs 14A to 14D. The common voltage Vcom supplied to each gate driver IC 16A to 16D is changed by the line resistances (a, b, c, d) of the signal line group 26. Accordingly, the first to fourth common voltages VCOM1 to VCOM4 have a relationship such that VCOM1>VCOM2>VCOM3>VCOM4. Accordingly, a difference in brightness occurs between horizontal line blocks A to D, which are respectively connected to the gate driver ICs 16A to 16D. The brightness difference of the horizontal line block A to D is shown in a horizontal line 32 phenomenon to make a screen appear to be divided, thereby resulting in a cross-talk phenomenon caused by the resistance between lines as well as a picture quality deterioration.

Figure 2:
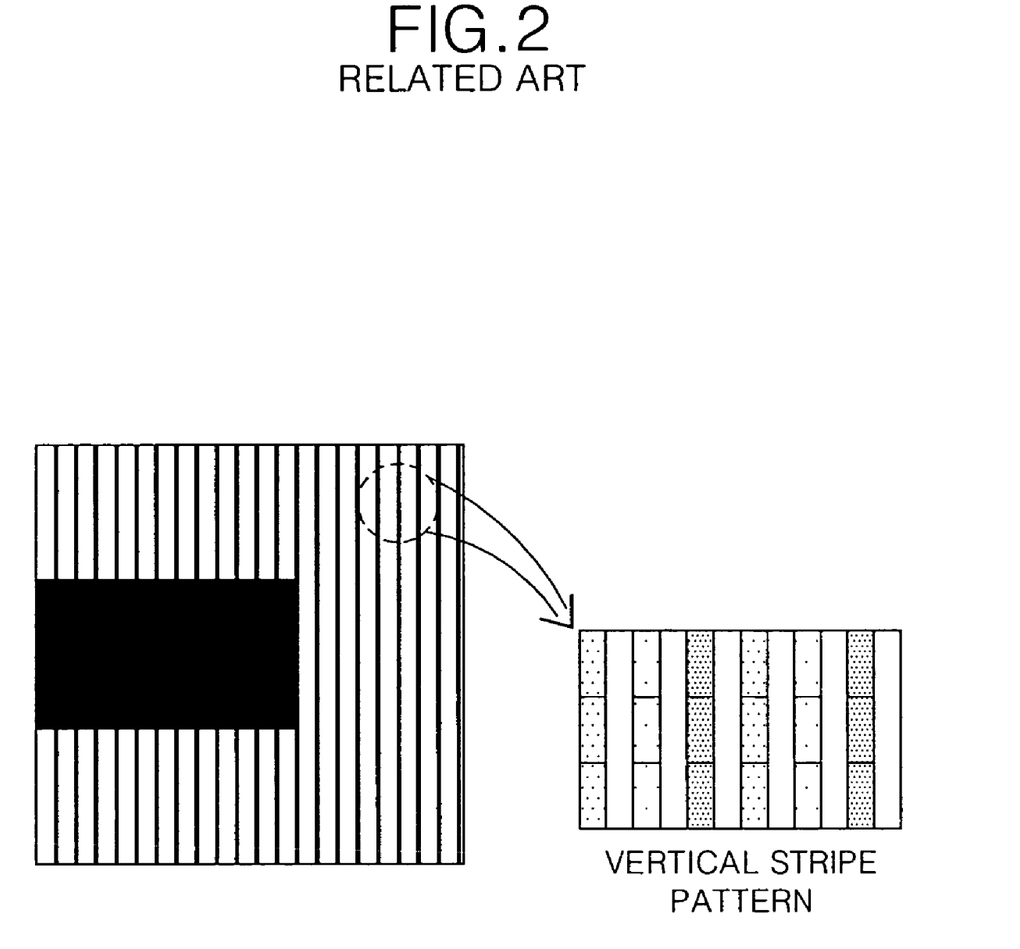
FIG. 2 is a diagram representing a test pattern in which a common voltage distortion can be observed.

FIG. 2 illustrates a vertical stripe pattern, which is a test pattern whereby the distortion of the common voltage Vcom is most intensely generated. Herein, an equivalent circuit between a panel and a drive circuit can be expressed as illustrated in FIG. 3.

Figure 3:
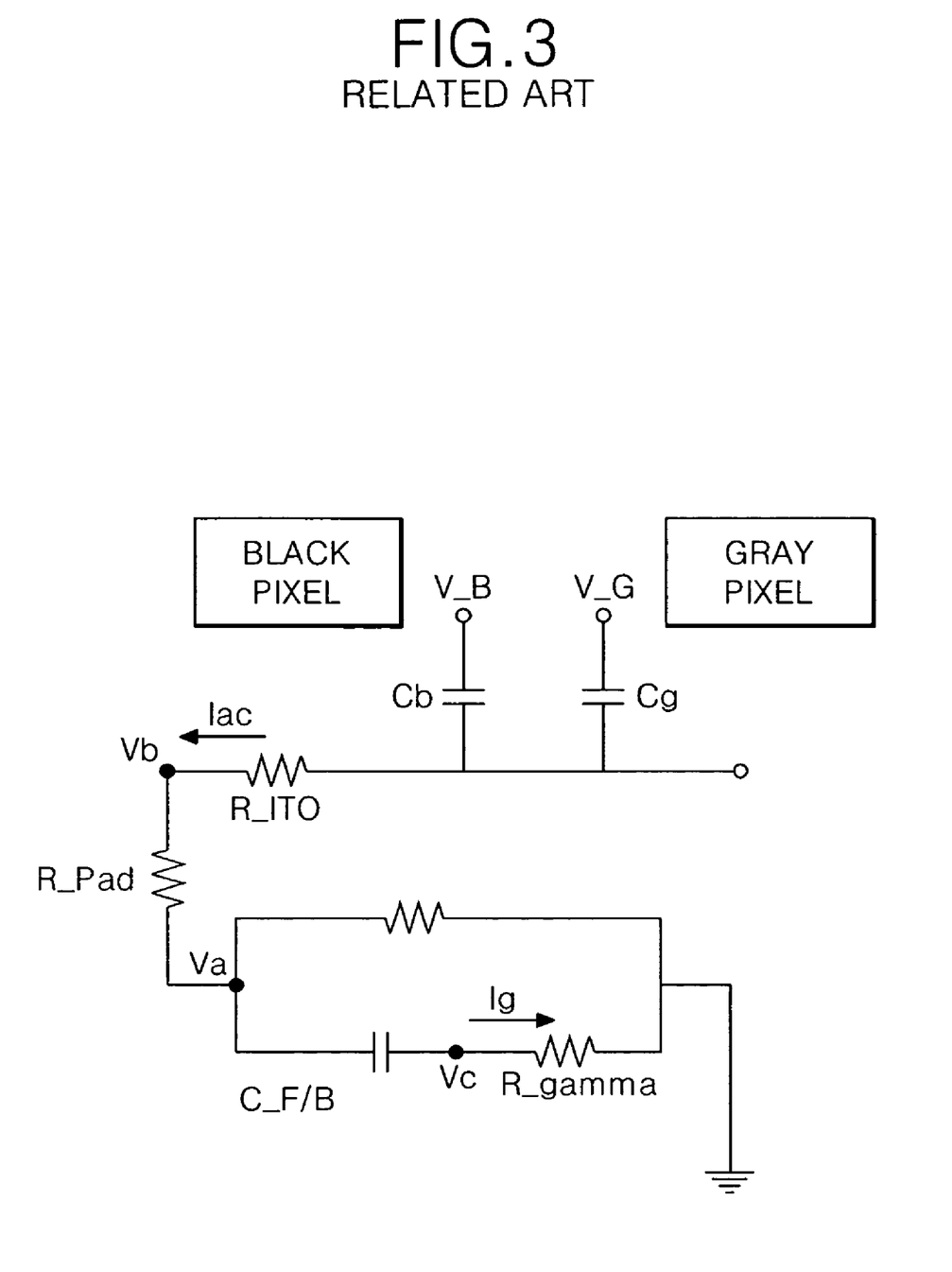
FIG. 3 is a diagram representing an equivalent circuit between a panel and a drive circuit in the liquid crystal display device illustrated in FIG. 1.

Referring to FIG. 3, the related art cross-talk phenomenon results from an alternating current Iac, which is imparted to the resistor R_ITO of the common electrode by energy that is stored in capacitors Cb and Cg, which are between a black pixel V_B and a gray pixel V_G. The alternating current Iac forms a path which is connected to a third node Vc and a gamma resistor R_gamma through a pad resistor R_pad that makes the driver IC in contact with the panel. A horizontal cross-talk is generated in a bordering part of a black bar due to a voltage coupling resulting from a difference between the voltage of the common electrode of a second node Vb and a gamma voltage of the third node Vc.

SUMMARY OF THE INVENTION

Accordingly, the present invention is directed to a liquid crystal display apparatus and driving method thereof that substantially obviates one or more of the problems due to limitations and disadvantages of the related art.

An advantage of the present invention is that it minimizes picture quality deterioration caused by signal distortion.

Another advantage of the present invention is that it minimizes the effect of gate line voltage changes due to signal line resistance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and described, a liquid crystal display device includes a liquid crystal display panel; an analyzer that analyzes a brightness characteristic of data in an area within an image; an average video signal voltage generator that calculates an average brightness value in the area; a bordering value processing part calculates a bordering brightness value in the area; and a weighting part that adjusts a pixel voltage according to the average brightness value and the bordering brightness value.

In another aspect of the present invention, a method of driving a liquid crystal display device includes analyzing a brightness characteristic of data in an area within an image; detecting a border in the area on the basis of the brightness characteristic of the data; calculating an average value in the area; and weighting a pixel data value according to the average value and a gamma voltage corresponding to the border in the area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to an embodiment of the present invention, example of which is illustrated in the accompanying drawings.

Figure 4:
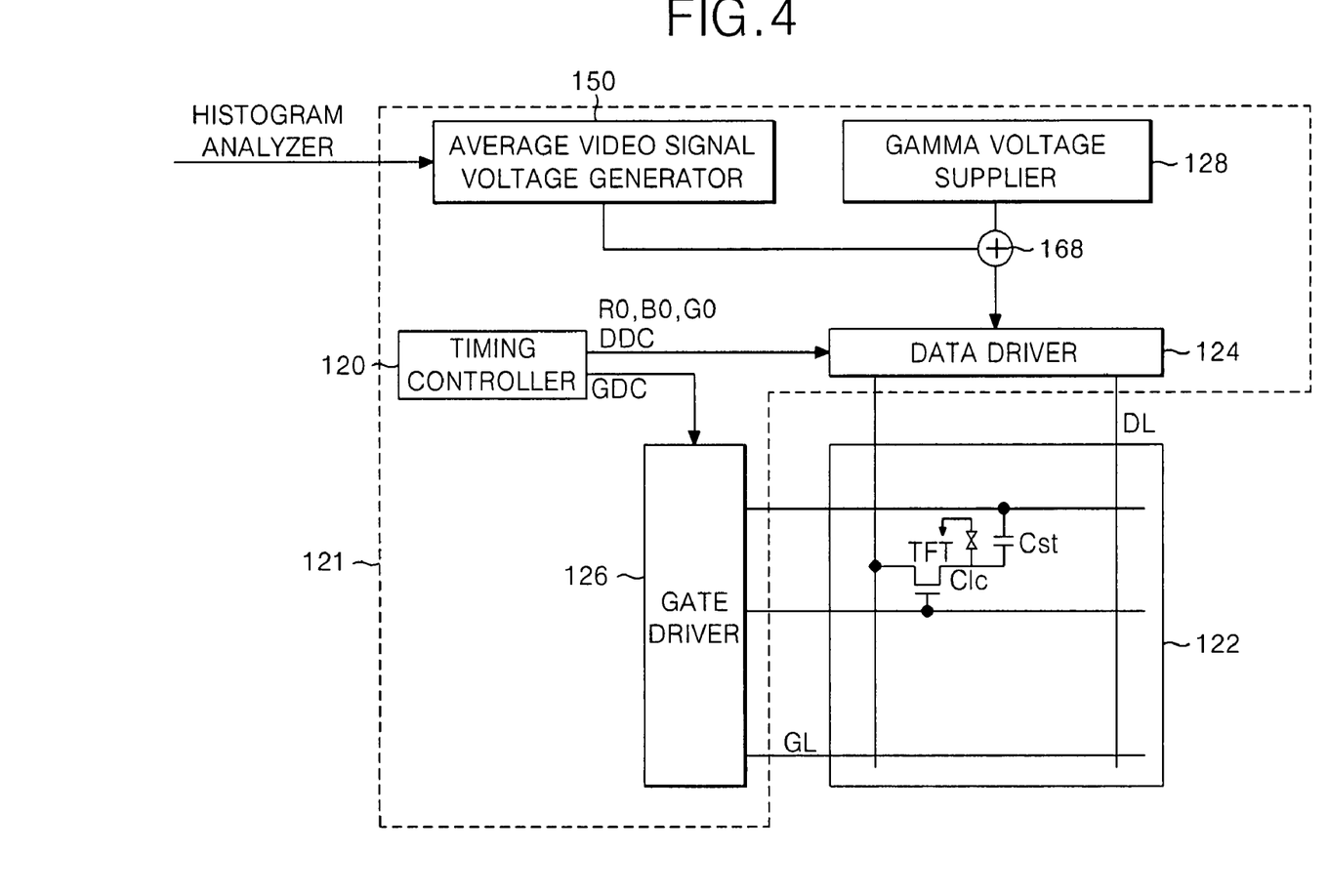
FIG. 4 is a diagram representing a liquid crystal display device according to an embodiment of the present invention.

FIG. 4 is a diagram representing a liquid crystal display device according to an embodiment of the present invention. Referring to FIG. 4, the liquid crystal display device according to the present invention includes a liquid crystal display panel 122 in which liquid crystal cells are arranged in a matrix pattern; and a driver device 121 for driving the liquid crystal display panel 122.

Figure 5:
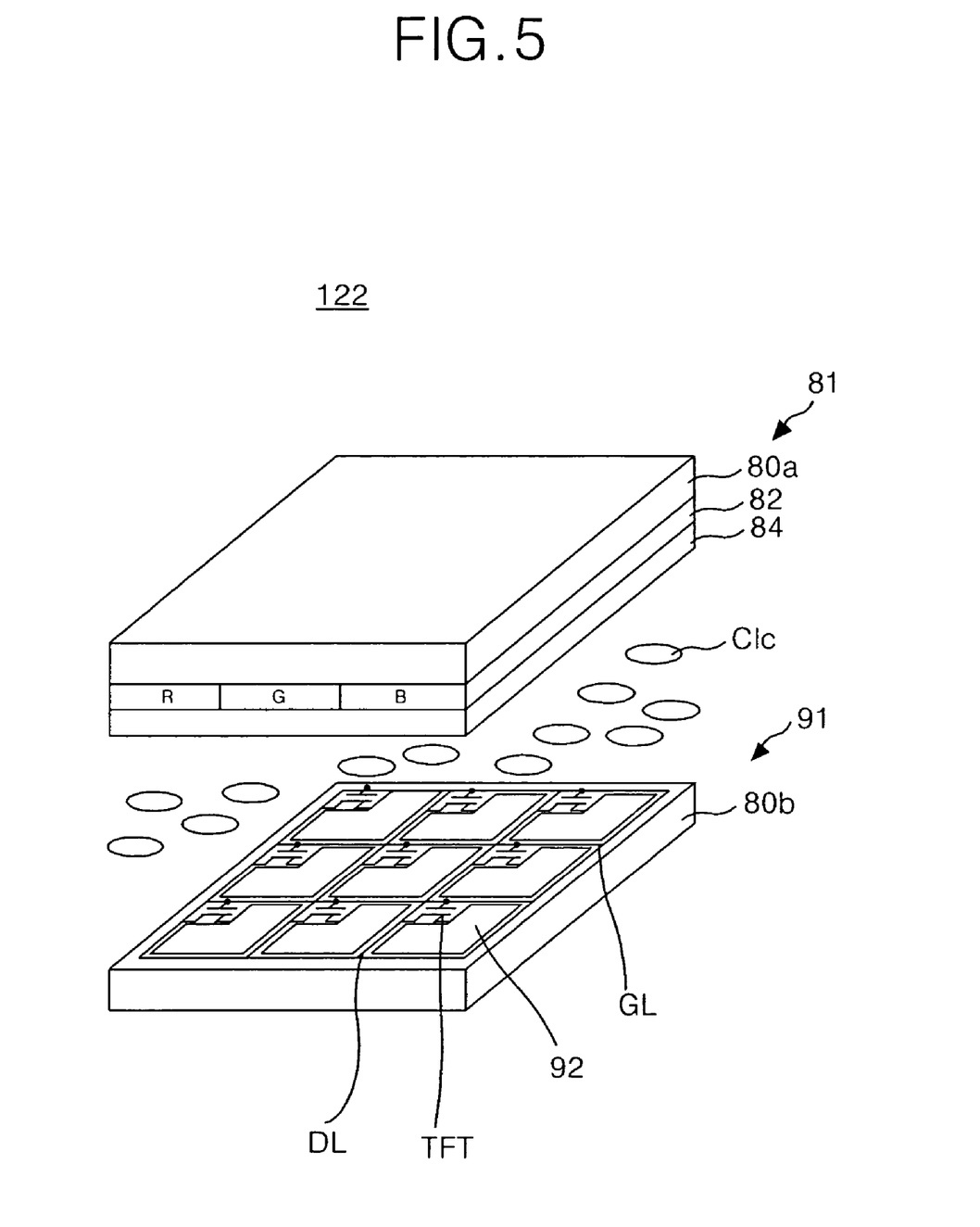
FIG. 5 illustrates a liquid crystal display panel of FIG. 4.

Referring to FIG. 5, the liquid crystal display panel 122 includes a color filter array substrate 81 and a thin film transistor array substrate 91 which are bonded with a liquid crystal Clc between them. The liquid crystal Clc rotates in response to an applied electric field, thereby controlling the transmittance of the light that is incident through the thin film transistor array substrate 91.

The color filter array substrate 81 includes a black matrix (not shown), a color filter 82 and a common electrode 84, which are formed on the rear surface of an upper substrate 80A. The black matrix is formed of an opaque material to absorb the light which is incident from the adjacent cell, thereby preventing the deterioration of contrast. The color filter 82 has color filter layers of red R, green G, blue B disposed in a stripe shape to transmit a light of a specific wavelength range, thereby enabling color display.

The thin film transistor array substrate 91 is formed on the front surface of a lower substrate 80B. The thin film transistor array substrate 91 includes data lines DL and gate lines GL that cross each other, and a TFT formed at the crossing. The TFT includes a gate electrode connected to the gate line GL, a source electrode connected to the data line DL, and a drain electrode facing the source electrode with a channel between them. The TFT is connected to a pixel electrode 92 through a contact hole that enables contact with the drain electrode. The TFT selectively supplies a data signal from the data line DL to the pixel electrode 92 in response to the gate signal from the gate line GL.

The pixel electrode 92 is located at a cell area, which is defined by the data line DL and the gate line GL. The pixel electrode 92 is formed of a transparent conductive material with a high light transmittance. The pixel electrode 92 generates a potential difference with the common electrode 84 formed on the upper substrate 80A, according to the data signal supplied through the drain electrode. The potential difference causes the liquid crystal Clc located between the lower substrate 80B and the upper substrate 80A to rotate due to the liquid crystal's dielectric anisotropy. Accordingly, the light supplied through the pixel electrode 92 from the light source is transmitted to the upper substrate 80A, depending on the strength of the electric field.

The driver device 121 includes: a gate driver 126 for driving the gate lines GL; a data driver 124 for driving the data lines DL; a gamma voltage supplier 128 to supply a gamma voltage to the data driver 124; a timing controller 120 for controlling the gate driver 126, the data driver 124, and the gamma voltage supplier 128; and an average video signal voltage generator 150 for calculating an average video signal based on a histogram analysis of a specific area.

The timing controller 120 controls the timing of the gate driver 126 and the data driver 124 and supplies the pixel data signal to the data driver 124.

The gate driver 126 sequentially supplies a scanning signal to the gate lines GL and sequentially drives the liquid crystal cells on the liquid crystal display panel 122 one line at a time.

The data driver 124 supplies the pixel voltage signal to each of the data lines DL corresponding to the scanning signal supplied to any one of the gate lines GL. Accordingly, the liquid crystal display device controls light transmittance by an electric field applied between the pixel electrode 92 and the common electrode 84 in accordance with the pixel voltage signal for each liquid crystal cell, thereby displaying a picture.

The average video signal voltage generator 150 generates and analyzes a histogram of an area where the gamma voltage rapidly changes and calculates an average value by use of a histogram averaging method to generate a voltage corresponding to the average gamma value.

Figure 6:
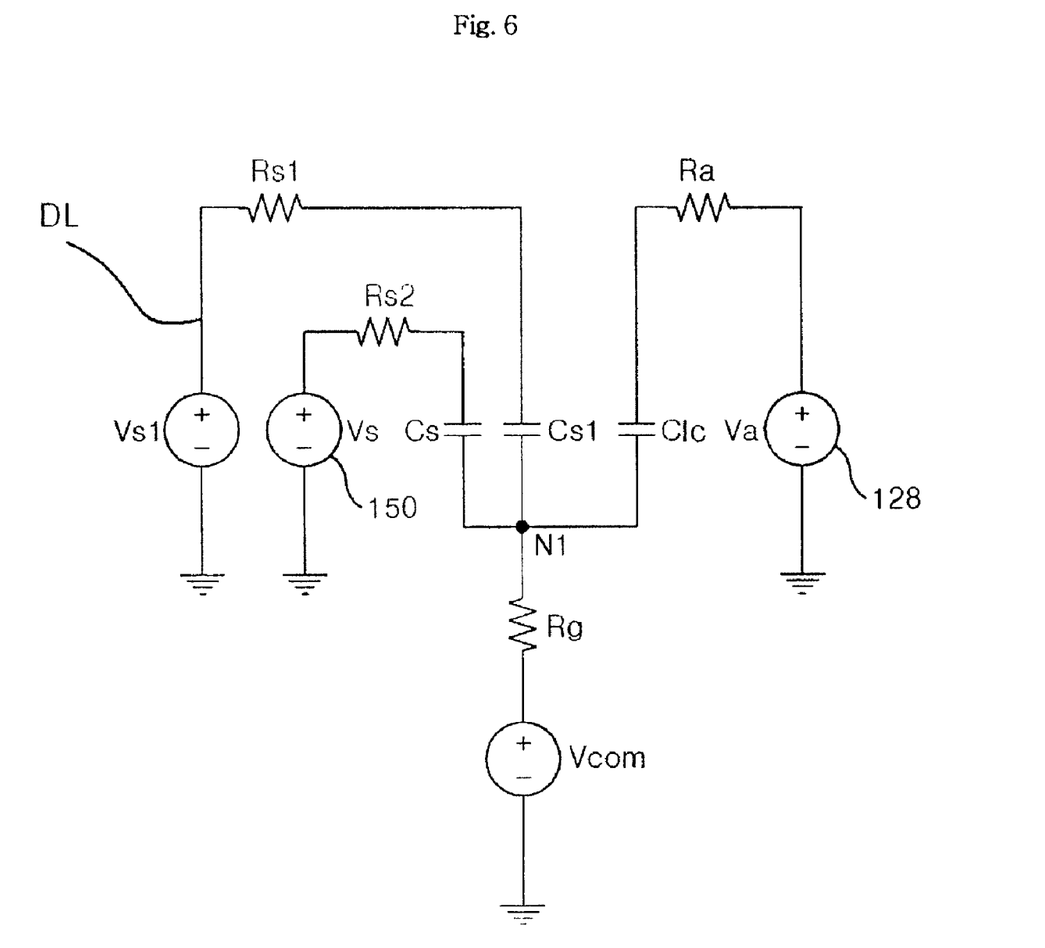
FIG. 6 is a diagram representing an equivalent circuit between a panel and a drive circuit of FIG. 5.

An exemplary equivalent circuit between a liquid crystal display panel 122 and a driver device 121 is illustrated in FIGS. 4 and 6. Referring to FIGS. 4 and 6, the equivalent circuit includes: a resistor Rs1 of a data line, a pixel capacitor Cs1 and a common electrode resistor Rg which are connected in series between the common voltage Vcom and a data signal voltage Vs1 that is supplied from the data driver 124; a first node N1 between a common electrode resistor Rg and the pixel capacitor Cs1; a resistor Rs2 of a data line and a pixel average capacitor Cs which are connected in series between the first node N1 and the average video signal voltage Vs that is supplied from the average video signal voltage generator 150; and a data line DL and TFT conductive resistor Ra and a capacitor Clc of liquid crystal which are connected in series between the gamma voltage Va and the first node N1.

Figure 7:
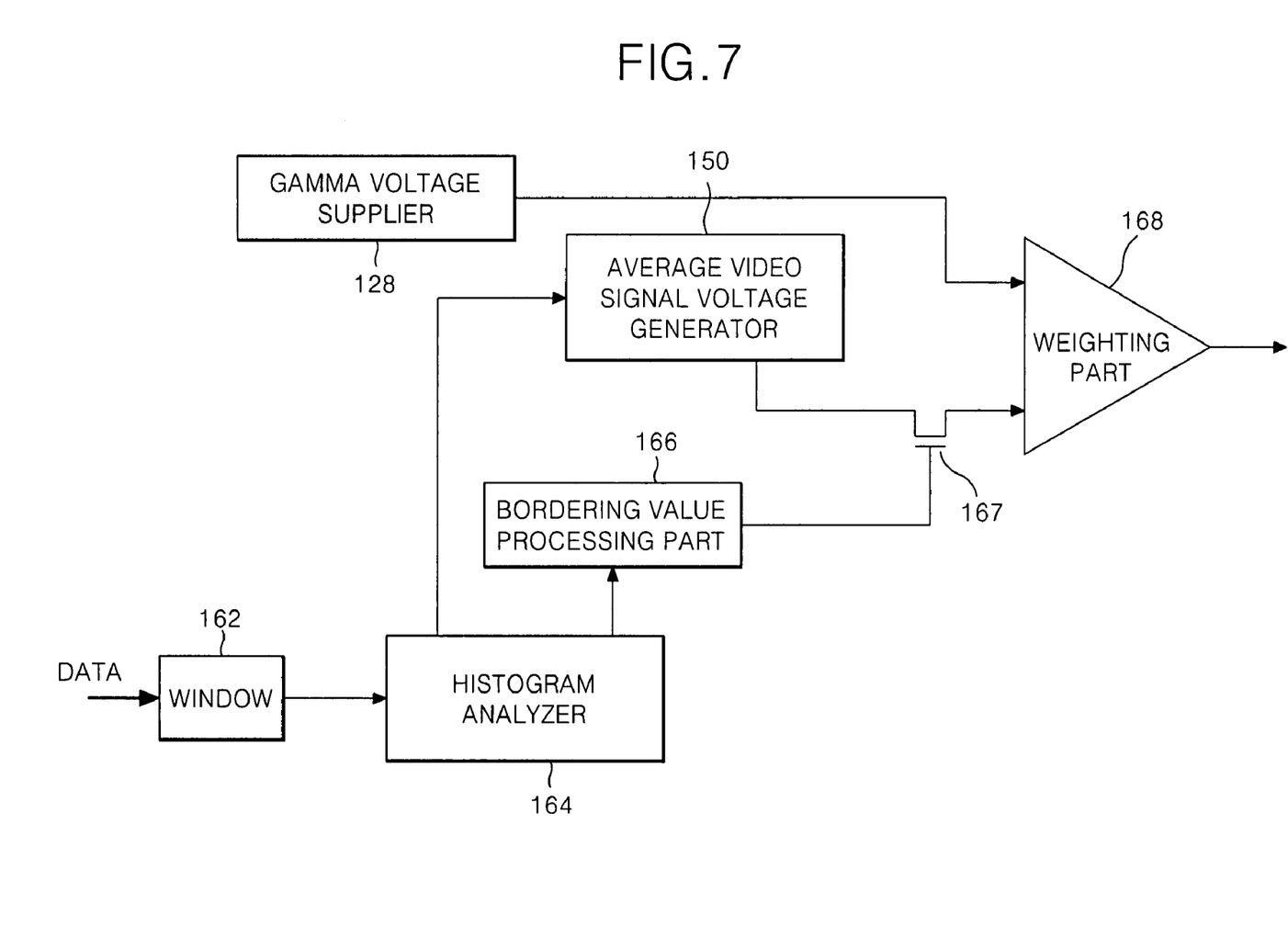
FIG. 7 is a block diagram representing a driving method of the liquid crystal display device according to an embodiment of the present invention.

A driving method between the panel and the drive device according to the present invention is explained in reference to the block diagram illustrated in FIG. 7.

Referring to FIG. 7, an exemplary driving method, as implemented by the driver device 121 according to the present invention, is as follows. Each block within FIG. 7 may represent a software component running on one or more embedded processors or microcontrollers. The window 162 collects a block of data, referred to as a set area, within the image where the gamma voltage Va of the liquid crystal capacitor Clc has either rapidly increased or decreased. The histogram analyzer 164 generates a histogram of the set area. In doing so, the histogram analyzer 164 generates an array of values corresponding to the gray level and its frequency of occurrence within the set area. The histogram analyzer 164 then determines the amount of increase or decrease in gamma voltage Va by dividing the set area into black, gray and white colors, each corresponding to a histogram bin, and calculating an average brightness value corresponding to each of the three sections by use of the histogram averaging method. The result of the histogram analyzer 164 is then supplied to a bordering value processing part 166 as well as the average video signal voltage generator 150.

The average video signal generator 150 takes the averaged histogram bin values from histogram analyzer 164 and generates an offset to shift average gray level to compensate for a lopsided gray level distribution. The output of average video signal generator 150, which includes the gray level offset, is applied to the input of switch 167.

The bordering value processing part 166 detects a border within the set area, such as a horizontal line 32 between regions A and B in FIG. 1. In doing so, the bordering value processing part 166 may compare the histogram data provided by histogram analyzer 164 with a pre-set reference value or a reference histogram. The bordering value processing part 166 then selectively applies the signal generated from the average video signal voltage generator 150 to the weighting part 168 by use of a switch 167. For example, bordering value processing part 166 may compare the average gray value i (from the average brightness values computed by histogram analyzer 164) with two threshold values. Particularly, for a possible brightness value ranging between 0 and 255, bordering value processing part 166 may determine if i conforms to the either of the following logical conditions: $0<i<64$, or $200<i<255$. If either of these conditions are true, then bordering value processing part outputs a high logical value (e.g., binary "1"), which it sends to the gate of switch 167. If either of the above logical conditions are true, then the gray level distribution is sufficiently lopsided to correspond to horizontal crosstalk.

If bordering value processing part 166 detects a lopsided gray level distribution, it outputs a high logic level to switch 167, which in turn applies the gray level offset generated by average video signal voltage generator 150 (and applied to input of switch 167) to weighting part 168. Weighting part 168 applies the offset to the gamma voltage from gamma voltage supplier 128 to offset the lopsided gray level distribution of border areas within the set area. The corrected signal, which is the output of weighing part 168, is applied to a pertinent pixel line to minimize horizontal cross-talk.

As described above, the liquid crystal display device according to the present invention analyzes a histogram of the area where the change of the video signal is high to generate the average video signal voltage and supplies the average video signal voltage to the area, thereby minimizing horizontal cross-talk. Accordingly, the liquid crystal display device according to the present invention can improve picture quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal display panel;
   an analyzer that generates an array of values corresponding to a gray level and its frequency of occurrence within a set area of an image where a gamma voltage rapidly increases or decreases, determines the amount of increase or decrease in the gamma voltage by dividing the set area into black, gray and white colors, and generates an averaged histogram bin value for each of the divided areas;
   an average video signal voltage generator that generates an offset to shift an average gray level to compensate for a lopsided gray level distribution based on the averaged histogram bin values;
   a bordering value processing part that compares the averaged histogram bin values with a pre-set reference value or a reference histogram to detect a border area within the set area and generate to a logic signal;
   a switch that selectively outputs the offset from the average video signal generator in response to the logic signal; and
   a weighting part that applies the offset to the gamma voltage to offset a lopsided gray level distribution of the border area within the set area,
   wherein a result of the analyzer is supplied to the bordering value processing part and the average video signal voltage generator,
   wherein the bordering value processing part selectively applies the signal generated from the average video signal voltage generator to the weighting part by use of the switch.

2. The liquid crystal display device according to claim 1, wherein an output of the bordering value processing part controls the switch.

3. The liquid crystal display device according to claim 1, further comprising a gamma voltage supplier that generates a gamma voltage corresponding to data, wherein the gamma voltage supplier is connected to an input of the weighting part.

4. The liquid crystal display device according to claim 1, wherein if the averaged histogram bin values are between 0 and 64 or between 200 and 255, the offset is applied to the gamma voltage.

5. A method of driving a liquid crystal display device, comprising:
   generating an array of values corresponding to a gray level and its frequency of occurrence within a set area of an image where a gamma voltage rapidly increases or decrease, determining the amount of increases or decrease in the gamma voltage by dividing the set area into black, gray and white colors, and generating an averaged histogram bin valuefor each of the divided areas;
   generating an offset to shift an average gray level to compensate for a lopsided gray level distribution based on the averaged histogram bin values;
   comparing the averaged histogram bin values with a preset reference value or a reference histogram to detect a border area within the set area and generate to a logic signal; and
   selectively applying the offset to the gamma voltage to offset a lopsided gray level distribution of the border area within the set area in response to the logic signal,
   wherein a result of the analyzer is supplied to the bordering value processing part and the average video signal voltage generator,
   wherein the bordering value processing part selectively applies the signal generated from an average video signal voltage generator to a weighting part by use of a switch.

6. The method according to claim 5, wherein if the averaged histogram bin values are between 0 and 64 or between 200 and 255, the offset is applied to the gamma voltage.

* * * * *